(12) United States Patent
Leider et al.

(10) Patent No.: US 11,632,646 B2
(45) Date of Patent: *Apr. 18, 2023

(54) PHYSICS-BASED AUDIO AND HAPTIC SYNTHESIS

(71) Applicant: Magic Leap, Inc., Plantation, FL (US)

(72) Inventors: Colby Nelson Leider, Coral Gables, FL (US); Justin Dan Mathew, Fort Lauderdale, FL (US); Michael Z. Land, Mill Valley, CA (US); Blaine Ivin Wood, Eagle Mountain, UT (US); Jung-Suk Lee, Santa Clara, CA (US); Anastasia Andreyevna Tajik, Fort Lauderdale, FL (US); Jean-Marc Jot, Aptos, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,273

(22) Filed: Apr. 12, 2022

(65) Prior Publication Data
US 2022/0240044 A1    Jul. 28, 2022

Related U.S. Application Data

(63) Continuation of application No. 17/127,204, filed on Dec. 18, 2020, now Pat. No. 11,337,023.
(Continued)

(51) Int. Cl.
*H04R 5/02* (2006.01)
*H04S 7/00* (2006.01)
(Continued)

(52) U.S. Cl.
CPC .............. *H04S 7/303* (2013.01); *G06F 3/165* (2013.01); *G06T 19/006* (2013.01)

(58) Field of Classification Search
CPC ........ H04S 7/303; G06F 3/165; G06T 19/006
(Continued)

(56) References Cited

U.S. PATENT DOCUMENTS

| 4,852,988 A | 8/1989 | Velez |
| 6,433,760 B1 | 8/2002 | Vaissie |

(Continued)

FOREIGN PATENT DOCUMENTS

| CA | 2316473 A1 | 1/2001 |
| CA | 2362895 A1 | 12/2002 |

(Continued)

OTHER PUBLICATIONS

Chinese Office Action dated Mar. 22, 2022, for CN Application No. 201980012935.2, with English translation, 18 pages.
(Continued)

*Primary Examiner* — Ammar T Hamid
(74) *Attorney, Agent, or Firm* — Morrison & Foerster LLP

(57) ABSTRACT

Disclosed herein are systems and methods for generating and presenting virtual audio for mixed reality systems. A method may include determining a collision between a first object and a second object, wherein the first object comprises a first virtual object. A memory storing one or more audio models can be accessed. It can be determined if the one or more audio models stored in the memory comprises an audio model corresponding to the first object. In accordance with a determination that the one or more audio models comprises an audio model corresponding to the first object, an audio signal can be synthesized, wherein the audio signal is based on the collision and the audio model corresponding to the first object, and the audio signal can be presented to a user via a speaker of a head-wearable device. In accordance with a determination that the one or more
(Continued)

audio models does not comprise an audio model corresponding to the first object, an acoustic property of the first object can be determined, a custom audio model based on the acoustic property of the first object can be generated, an audio signal can be synthesized, wherein the audio signal is based on the collision and the custom audio model, and the audio signal can be presented, via a speaker of a head-wearable device, to a user.

17 Claims, 13 Drawing Sheets

Related U.S. Application Data

(60) Provisional application No. 62/951,657, filed on Dec. 20, 2019.

(51) Int. Cl.
*G06F 3/16* (2006.01)
*G06T 19/00* (2011.01)

(58) Field of Classification Search
USPC .................................. 381/300, 303
See application file for complete search history.

(56) References Cited

U.S. PATENT DOCUMENTS

| | | | |
|---|---|---|---|
| 6,491,391 B1 | 12/2002 | Blum et al. | |
| 6,847,336 B1 | 1/2005 | Lemelson | |
| 6,943,754 B2 | 9/2005 | Aughey | |
| 6,977,776 B2 | 12/2005 | Volkenandt et al. | |
| 7,347,551 B2 | 3/2008 | Fergason et al. | |
| 7,488,294 B2 | 2/2009 | Torch | |
| 8,235,529 B1 | 8/2012 | Raffle | |
| 8,611,015 B2 | 12/2013 | Wheeler | |
| 8,638,498 B2 | 1/2014 | Bohn et al. | |
| 8,696,113 B2 | 4/2014 | Lewis | |
| 8,831,255 B2 | 9/2014 | Crawford | |
| 8,929,589 B2 | 1/2015 | Publicover et al. | |
| 9,010,929 B2 | 4/2015 | Lewis | |
| 9,183,676 B2 | 11/2015 | Mcculloch | |
| 9,274,338 B2 | 3/2016 | Robbins et al. | |
| 9,292,973 B2 | 3/2016 | Bar-Zeev et al. | |
| 9,418,479 B1 | 8/2016 | Worley, III et al. | |
| 9,720,505 B2 | 8/2017 | Gribetz et al. | |
| 10,013,053 B2 | 7/2018 | Cederlund et al. | |
| 10,025,379 B2 | 7/2018 | Drake et al. | |
| 11,337,023 B2 * | 5/2022 | Leider ..................... | G06F 3/167 |
| 11,403,825 B2 | 8/2022 | Tajik | |
| 2002/0005108 A1 | 1/2002 | Ludwig | |
| 2003/0030597 A1 | 2/2003 | Geist | |
| 2006/0023158 A1 | 2/2006 | Howell et al. | |
| 2008/0013746 A1 * | 1/2008 | Reichelt ................. | H04S 3/008 |
| | | | 381/63 |
| 2011/0211056 A1 | 9/2011 | Publicover et al. | |
| 2011/0213664 A1 | 9/2011 | Osterhout | |
| 2012/0021806 A1 | 1/2012 | Maltz | |
| 2013/0286004 A1 | 10/2013 | Mcculloch et al. | |
| 2014/0195918 A1 | 7/2014 | Friedlander | |
| 2015/0141102 A1 | 5/2015 | Asami et al. | |
| 2015/0168731 A1 | 6/2015 | Robbins | |
| 2016/0212272 A1 | 7/2016 | Srinivasan | |
| 2018/0220251 A1 | 8/2018 | Brettle et al. | |
| 2019/0116448 A1 | 4/2019 | Schmidt | |
| 2020/0368616 A1 | 11/2020 | Delamont | |
| 2021/0082191 A1 | 3/2021 | Tajik | |
| 2021/0195360 A1 | 6/2021 | Leider et al. | |
| 2021/0248803 A1 * | 8/2021 | Kojima ................... | G06T 19/00 |
| 2021/0264677 A1 * | 8/2021 | Ishihara ................. | G06T 19/20 |
| 2021/0375257 A1 | 12/2021 | Tajik et al. | |
| 2021/0377693 A1 * | 12/2021 | Bou ........................ | H04W 4/12 |
| 2022/0327788 A1 | 10/2022 | Tajik | |

FOREIGN PATENT DOCUMENTS

| | | |
|---|---|---|
| CA | 2388766 A1 | 12/2003 |
| CN | 102902355 A | 1/2013 |
| CN | 103201731 A | 7/2013 |
| JP | 2014039597 A | 3/2014 |
| WO | 2012074528 A1 | 6/2012 |
| WO | 2018026828 A1 | 2/2018 |
| WO | 2018224847 A2 | 12/2018 |
| WO | 2019161312 A1 | 8/2019 |
| WO | 2021243098 A1 | 12/2021 |

OTHER PUBLICATIONS

Chines Office Action dated Dec. 3, 2021, for CN Application No. 201980012935.2, with English Translation, 12 pages.
Chines Office Action dated May 11, 2021, for CN Application No. 201980012935.2, with English Translation, 14 pages.
International Preliminary Report on Patentability dated Aug. 18, 2020, for PCT Application No. PCT/US2019/18366, filed Feb. 15, 2019, six pages.
International Search Report and Written Opinion, dated Aug. 31, 2021, for PCT Application No. PCT/US2021/34639, filed May 27, 2021, fourteen pages.
International Search Report and Written Opinion, dated Jun. 11, 2019, for PCT Application No. PCT/US2019/18366, filed Feb. 15, 2019, 14 pages.
Non Final Office Action dated Feb. 17, 2022, for U.S. Appl. No. 16/970,323, filed Aug. 14, 2020, nineteen pages.
Notice of Allowance dated Mar. 7, 2022, for U.S. Appl. No. 17/127,204, filed Dec. 18, 2020, nine pages.
Non Final Office Action dated Aug. 9, 2022, for U.S. Appl. No. 17/332,913, filed May 27, 2021, ten pages.
Notice of Allowance dated May 26, 2022, for U.S. Appl. No. 16/970,323, filed Aug. 14, 2020, five pages.
Japanese Office Action dated Dec. 26, 2022, for JP Application No. 2020-543357, with English translation, 15 pages.
Chines Final Office Action dated Jun. 16, 2022, for CN Application No. 201980012935.2, with English translation, 16 pages.
Chines Notice of Allowance dated Nov. 22, 2022, for CN Application No. 201980012935.2, with English translation, 6 pages.
International Preliminary Report on Patentability dated Dec. 8, 2022, for PCT Application No. PCT/US2021/34639, filed May 27, 2021, nine pages.
Jacob, R. "Eye Tracking in Advanced Interface Design", Virtual Environments and Advanced Interface Design, Oxford University Press, Inc. (Jun. 1995).
Non-Final Office Action dated Nov. 25, 2022, for U.S. Appl. No. 17/852,158, filed Jun. 28, 2022, nine pages.
Rolland, J. et al., "High-resolution inset head-mounted display", Optical Society of America, vol. 37, No. 19, Applied Optics, (Jul. 1, 1998).
Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution insert Head Mounted Display", (Jun. 1994).
Notice of Allowance dated Dec. 16, 2022, for U.S. Appl. No. 17/332,913, filed May 27, 2021, six pages.

* cited by examiner

PHYSICS-BASED AUDIO AND HAPTIC SYNTHESIS

CROSS-REFERENCE TO RELATED APPLICATIONS

This application is a Continuation of U.S. Non-Provisional application Ser. No. 17/127,204, filed on Dec. 18, 2020, which claims benefit of U.S. Provisional Patent Application No. 62/951,657, filed Dec. 20, 2019, the contents of which is incorporated herein by reference in its entirety.

FIELD

This disclosure relates in general to systems and methods for presenting audio and haptic signals, and in particular to systems and methods for presenting audio and haptic signals to a user of a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. Such systems can offer a uniquely heightened sense of immersion and realism by combining virtual visual and audio cues with real sights and sounds. Accordingly, it can be desirable to present digital sounds to a user of an XR system in such a way that the sounds seem to be occurring—naturally, and consistently with the user's expectations of the sound—in the user's real environment. Generally speaking, users expect that virtual sounds will take on the acoustic properties of the real environment in which they are heard. For instance, a user of an XR system in a large concert hall will expect the virtual sounds of the XR system to have large, cavernous sonic qualities; conversely, a user in a small apartment will expect the sounds to be more dampened, close, and immediate.

Existing technologies often fall short of these expectations, such as by presenting virtual audio that does not take into account a user's surroundings, leading to feelings of inauthenticity that can compromise the user experience. Observations of users of XR systems indicate that while users may be relatively forgiving of visual mismatches between virtual content and a real environment (e.g., inconsistencies in lighting); users may be more sensitive to auditory mismatches. Our own auditory experiences, refined continuously throughout our lives, can make us acutely aware of how our physical environments affect the sounds we hear; and we can be hyper-aware of sounds that are inconsistent with those expectations. With XR systems, such inconsistencies can be jarring, and can turn an immersive and compelling experience into an implausible, imitative one. In extreme examples, auditory inconsistencies can cause motion sickness and other ill effects as the inner ear is unable to reconcile auditory stimuli with their corresponding visual cues.

Users of XR systems may expect to hear virtual sounds that correspond to virtual objects generating the virtual sounds. In some cases, virtual sounds can be synthesized using recordings of real sounds that may be mixed together to produce a desired virtual sound. However, this approach suffers from several disadvantages. Using a database of real sounds may require a large amount of memory to store enough real sounds to produce a wide range of virtual sounds. In some cases, it may be desirable to produce a virtual sound that does not have a corresponding real sound (e.g., a recorded real sound that corresponds to the desired virtual sound may not exist) and that is sufficiently different from real sounds that the virtual sound may not be accurately synthesized from real sounds. Accordingly, it can be desirable to develop a virtual audio synthesis system that can produce a wide range of virtual sounds that still have real acoustic properties that a user expects in a virtual sound.

BRIEF SUMMARY

Examples of the disclosure describe systems and methods for generating and presenting virtual audio for mixed reality systems. According to examples of the disclosure, a method may include determining a collision between a first object and a second object, wherein the first object comprises a first virtual object. A memory storing one or more audio models can be accessed. It can be determined if the one or more audio models stored in the memory comprises an audio model corresponding to the first object. In accordance with a determination that the one or more audio models comprises an audio model corresponding to the first object, an audio signal can be synthesized, wherein the audio signal is based on the collision and the audio model corresponding to the first object, and the audio signal can be presented to a user via a speaker of a head-wearable device. In accordance with a determination that the one or more audio models does not comprise an audio model corresponding to the first object, an acoustic property of the first object can be determined, a custom audio model based on the acoustic property of the first object can be generated, an audio signal can be synthesized, wherein the audio signal is based on the collision and the custom audio model, and the audio signal can be presented, via a speaker of a head-wearable device, to a user.

DETAILED DESCRIPTION

Figure 1A:
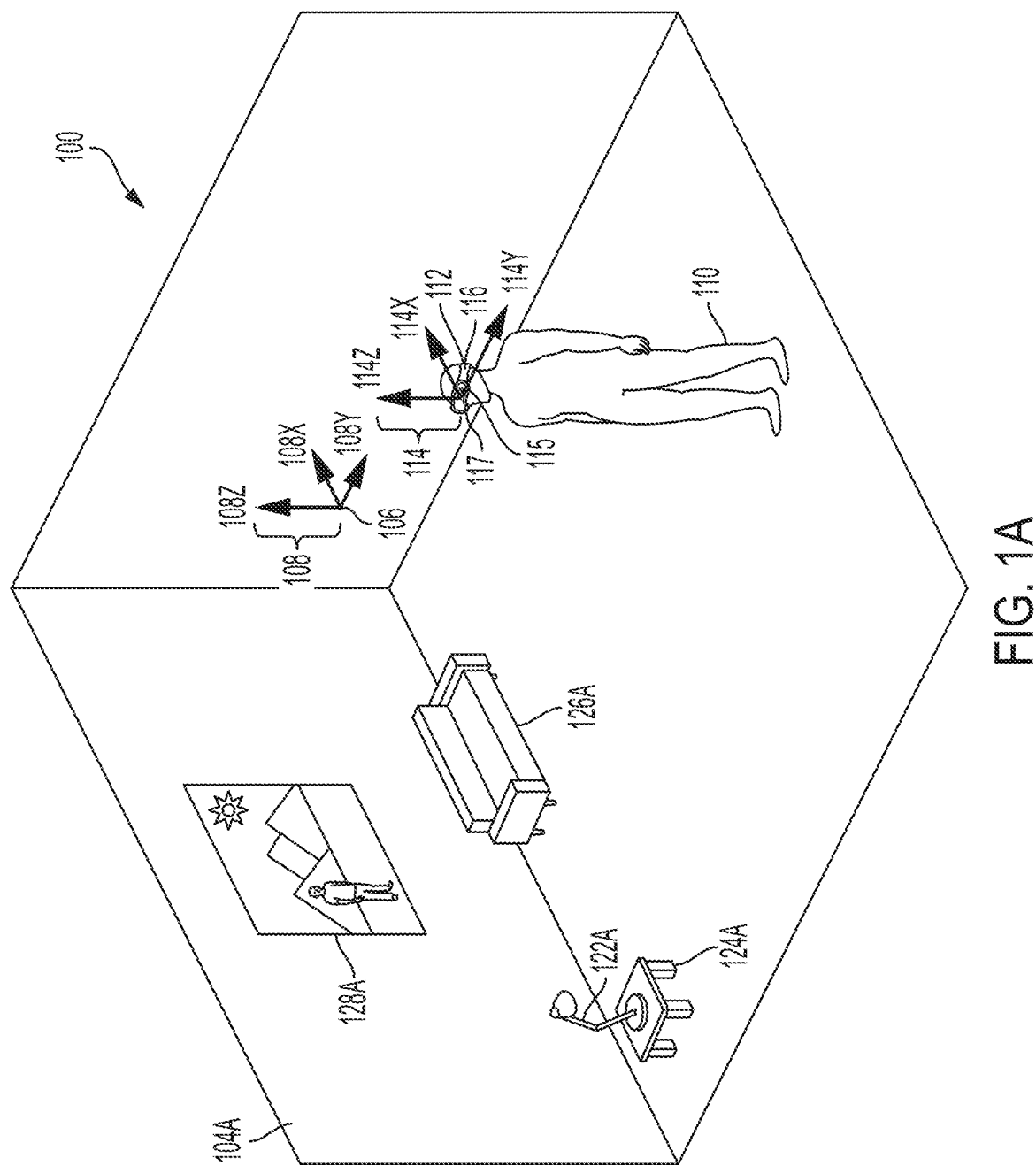
FIGS. 1A-1C illustrate an example mixed reality environment, according to some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses sight, sound, touch, taste, smell—and interacts with the real environment by moving one's own body in the real environment. Locations in a real environment can be described as coordinates in a coordinate space; for example, a coordinate can include latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE includes a real lamp post (a real object) at a location coordinate, the virtual environment of the MRE may include a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may include a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may include a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of a MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may include a display (e.g., a transmissive display) and one or more speakers, and one or more sensors (e.g., a camera), for example as described below. The real environment 100 shown includes a rectangular room 104A, in which user 110 is standing; and real objects 122A (a lamp), 124A (a table), 126A (a sofa), and 128A (a painting). Room 104A further includes a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
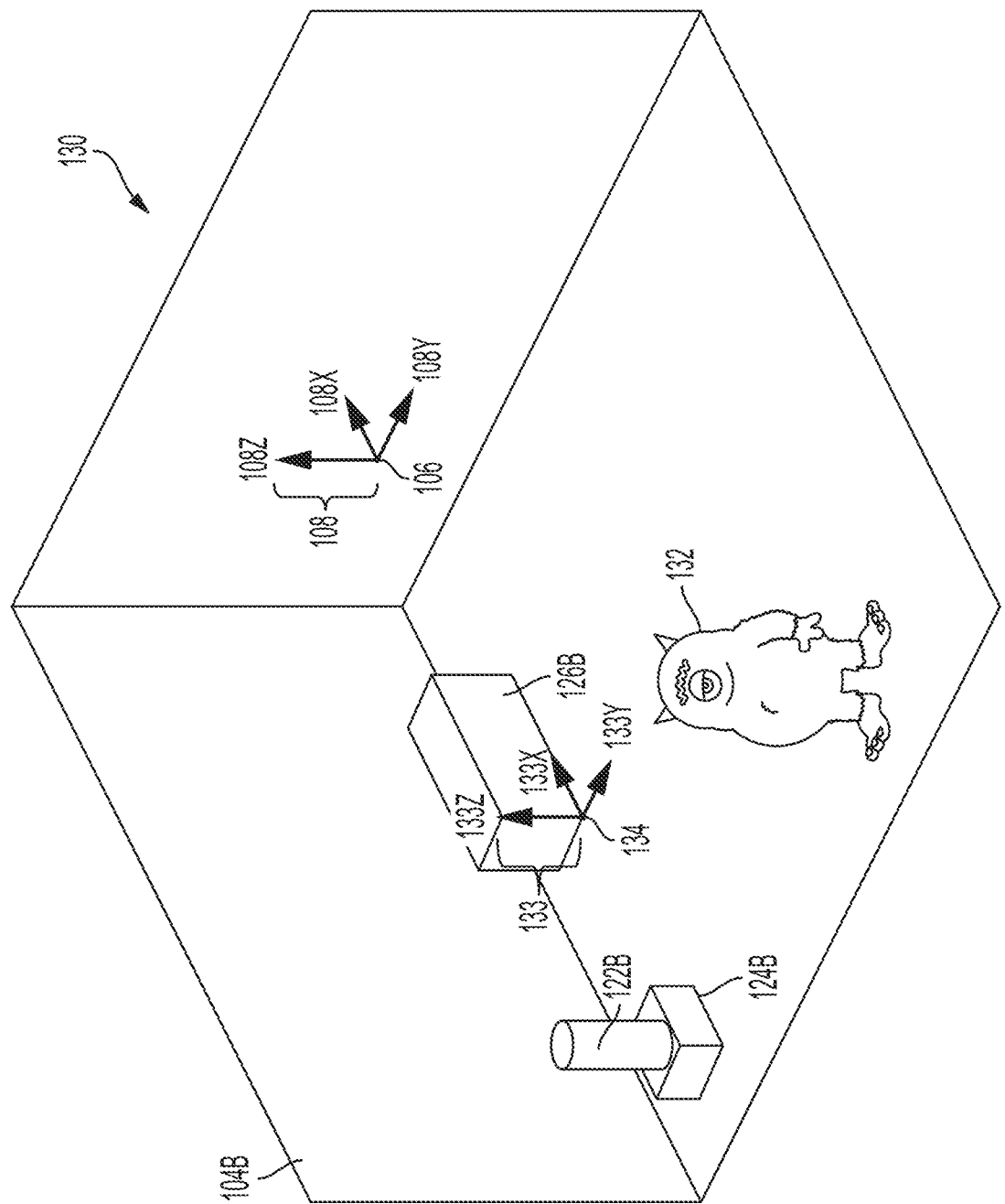

FIG. 1B illustrates an example virtual environment 130 that corresponds to real environment 100. The virtual environment 130 shown includes a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally includes a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
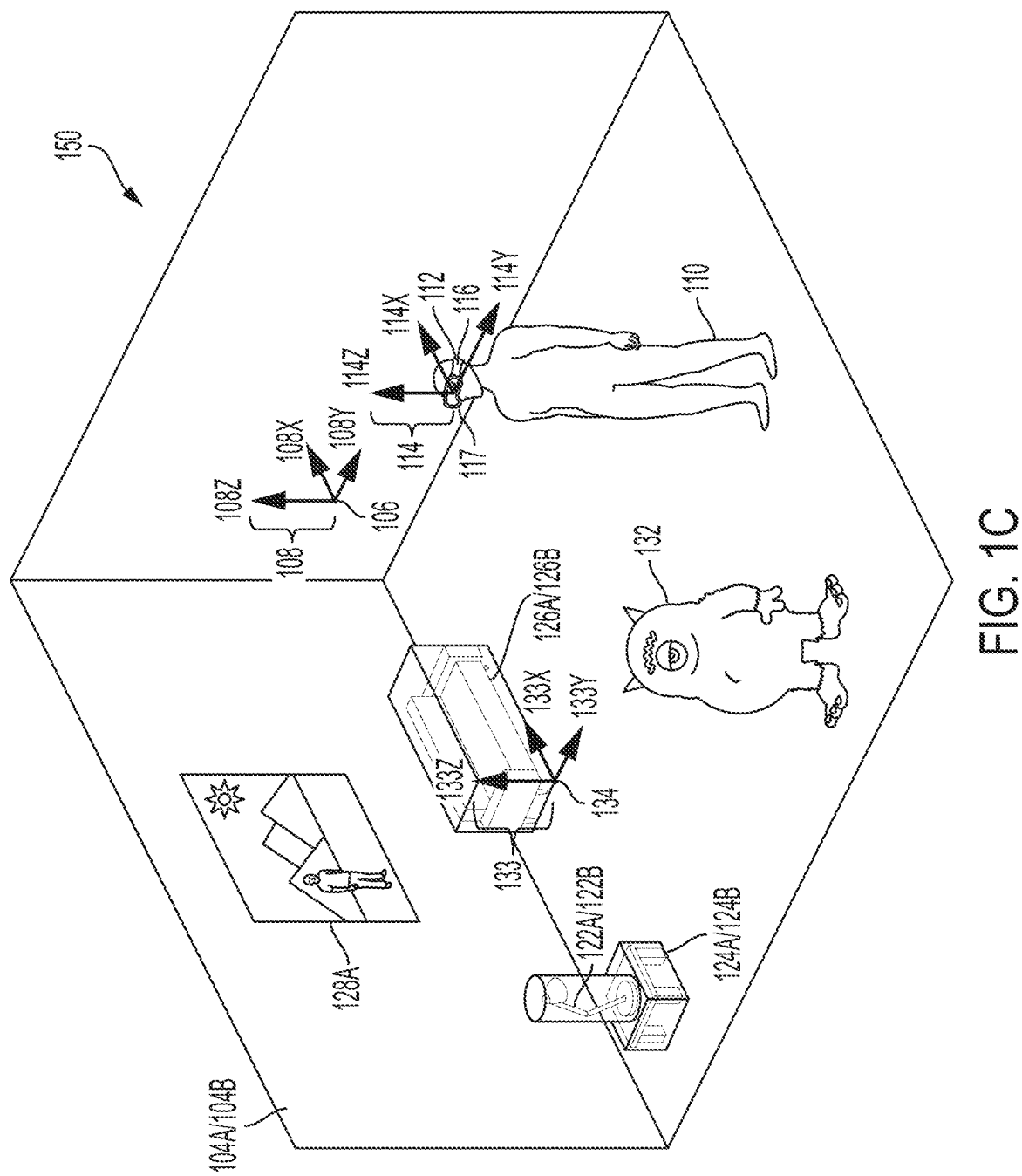

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects include corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may include left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
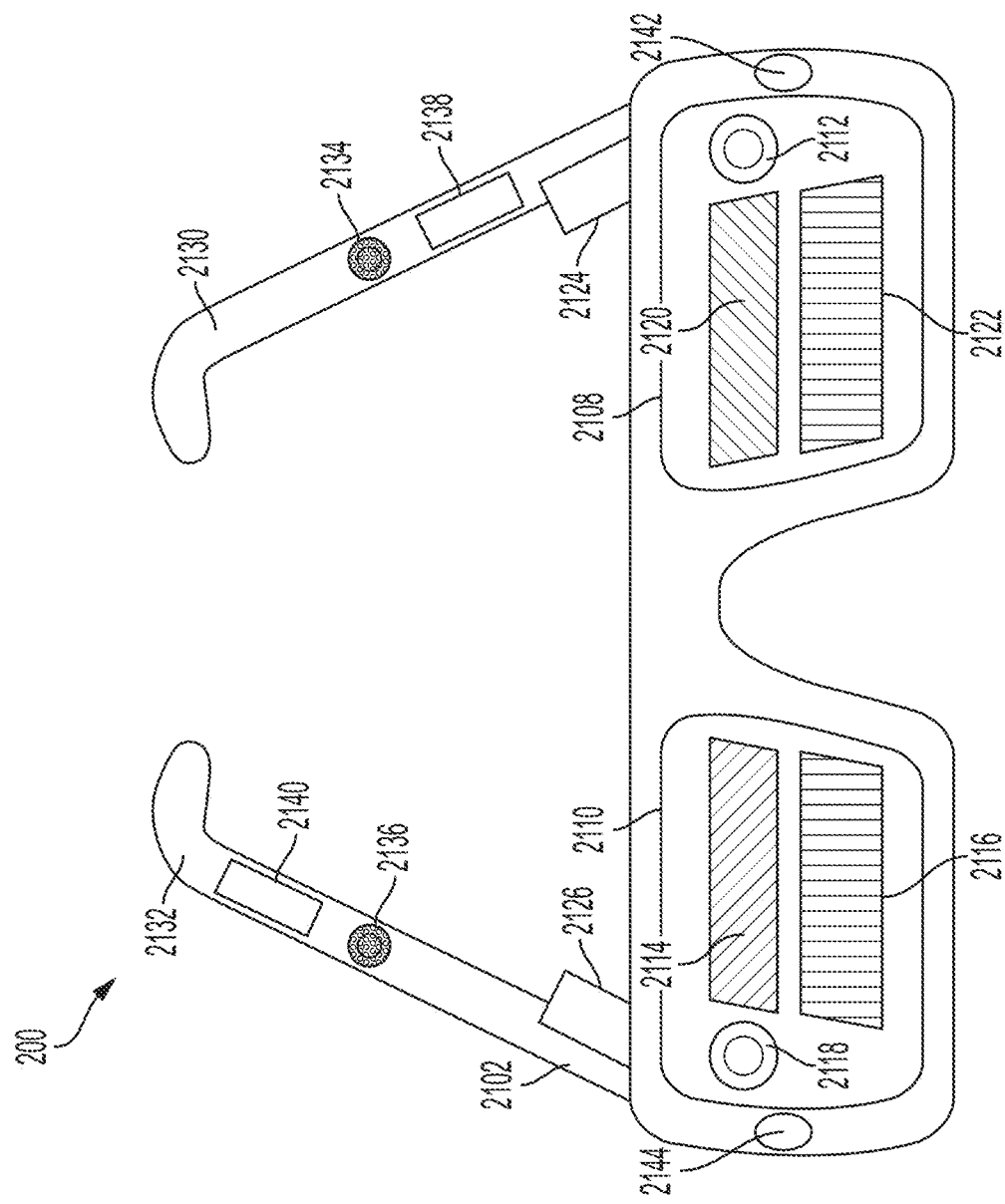
FIGS. 2A-2D illustrate components of an example mixed reality system that can be used to generate and interact with a mixed reality environment, according to some embodiments.
Figure 2B:
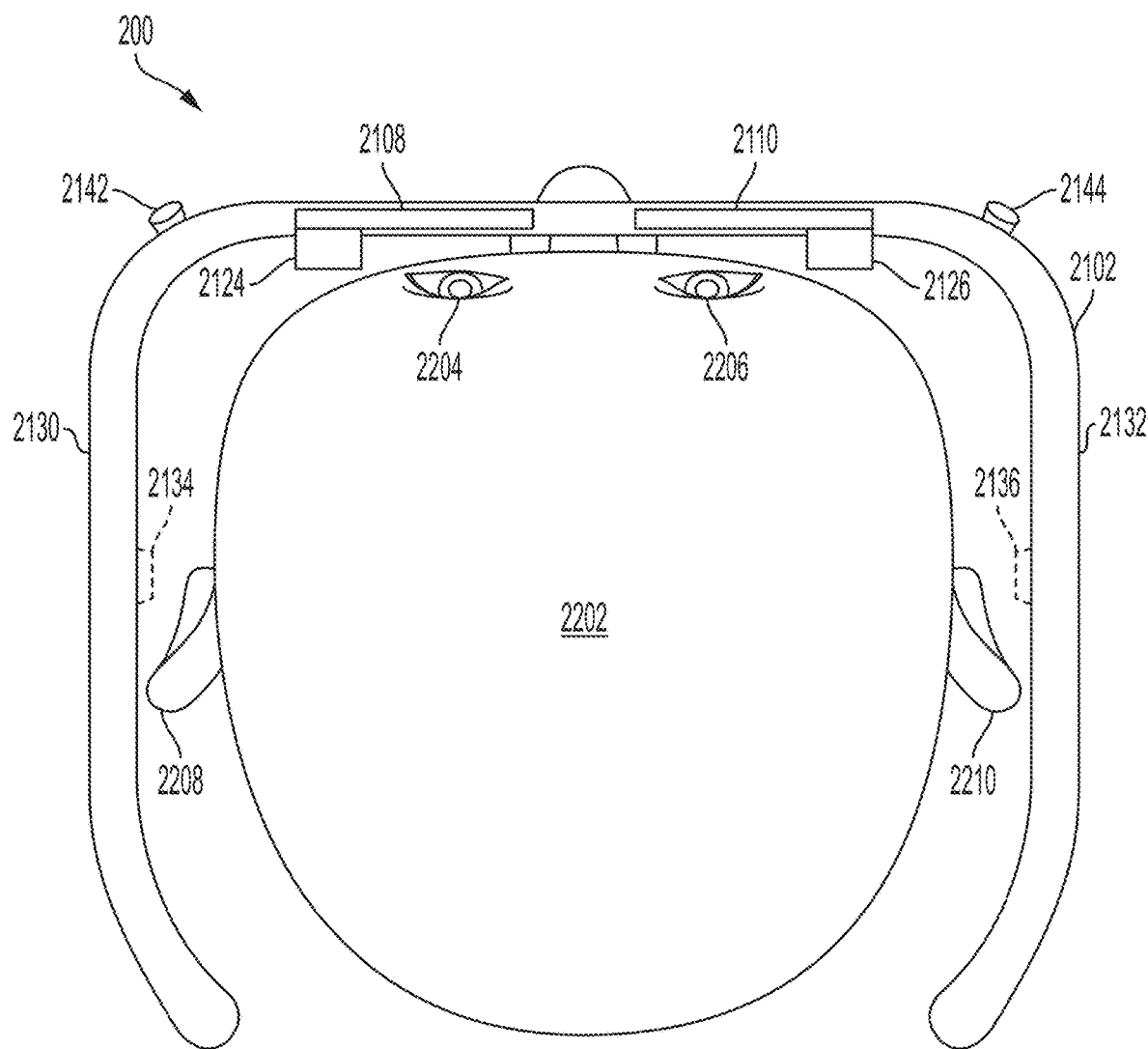
Figure 2C:
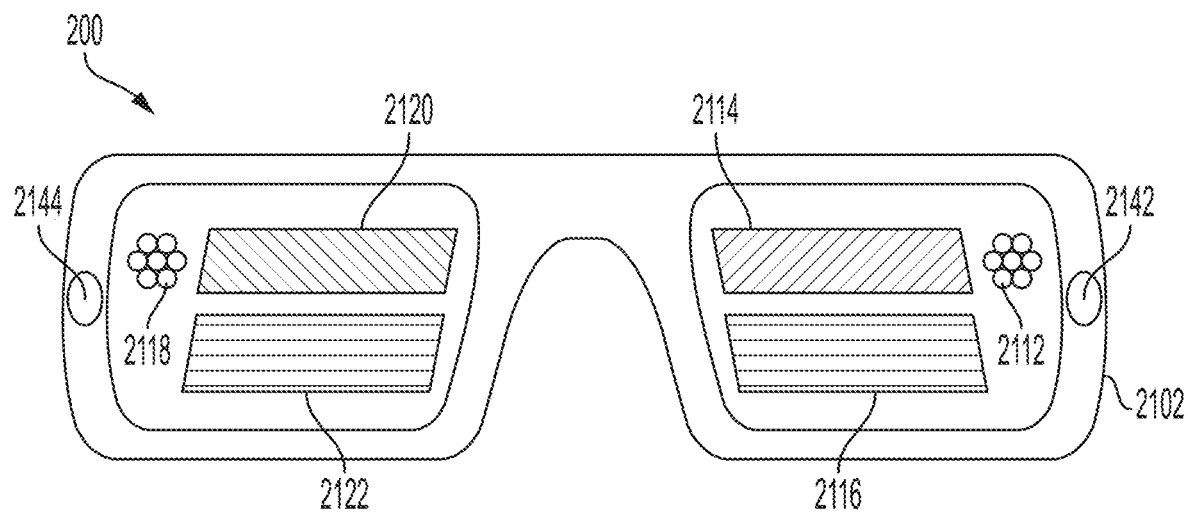
Figure 2D:
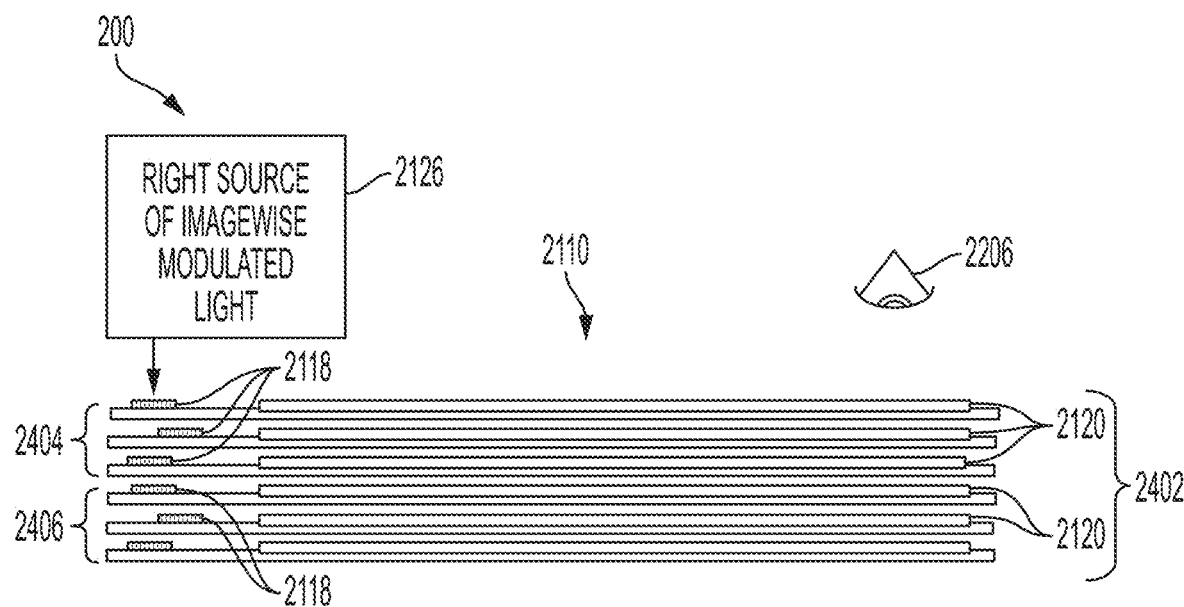

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
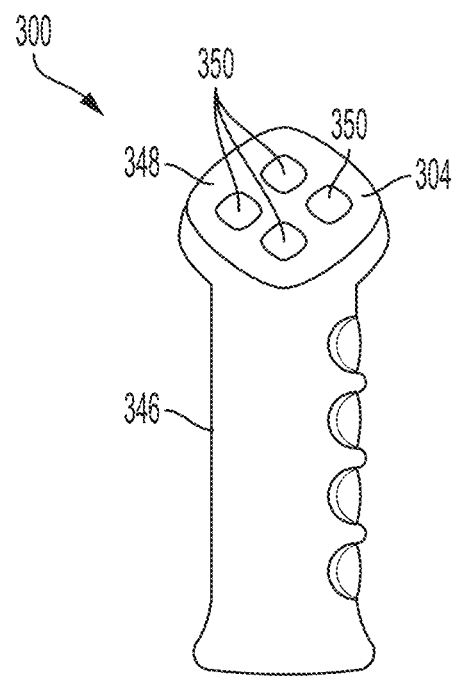
FIG. 3A illustrates an example mixed reality handheld controller that can be used to provide input to a mixed reality environment, according to some embodiments.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
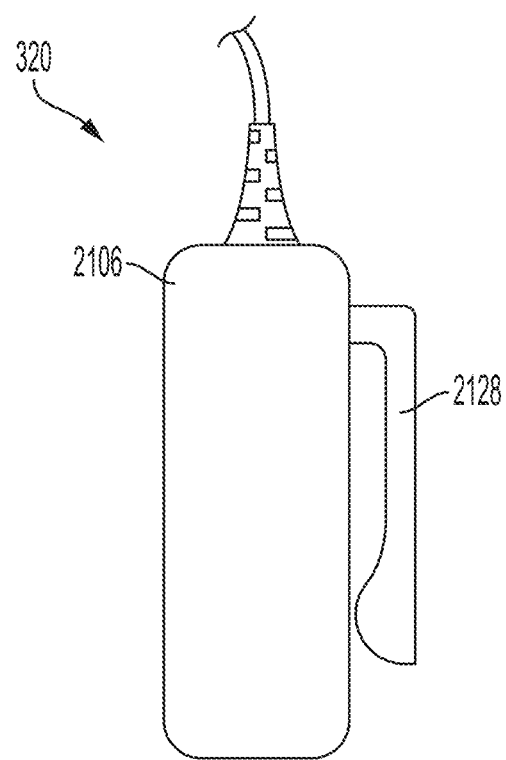
FIG. 3B illustrates an example auxiliary unit that can be used with an example mixed reality system, according to some embodiments.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
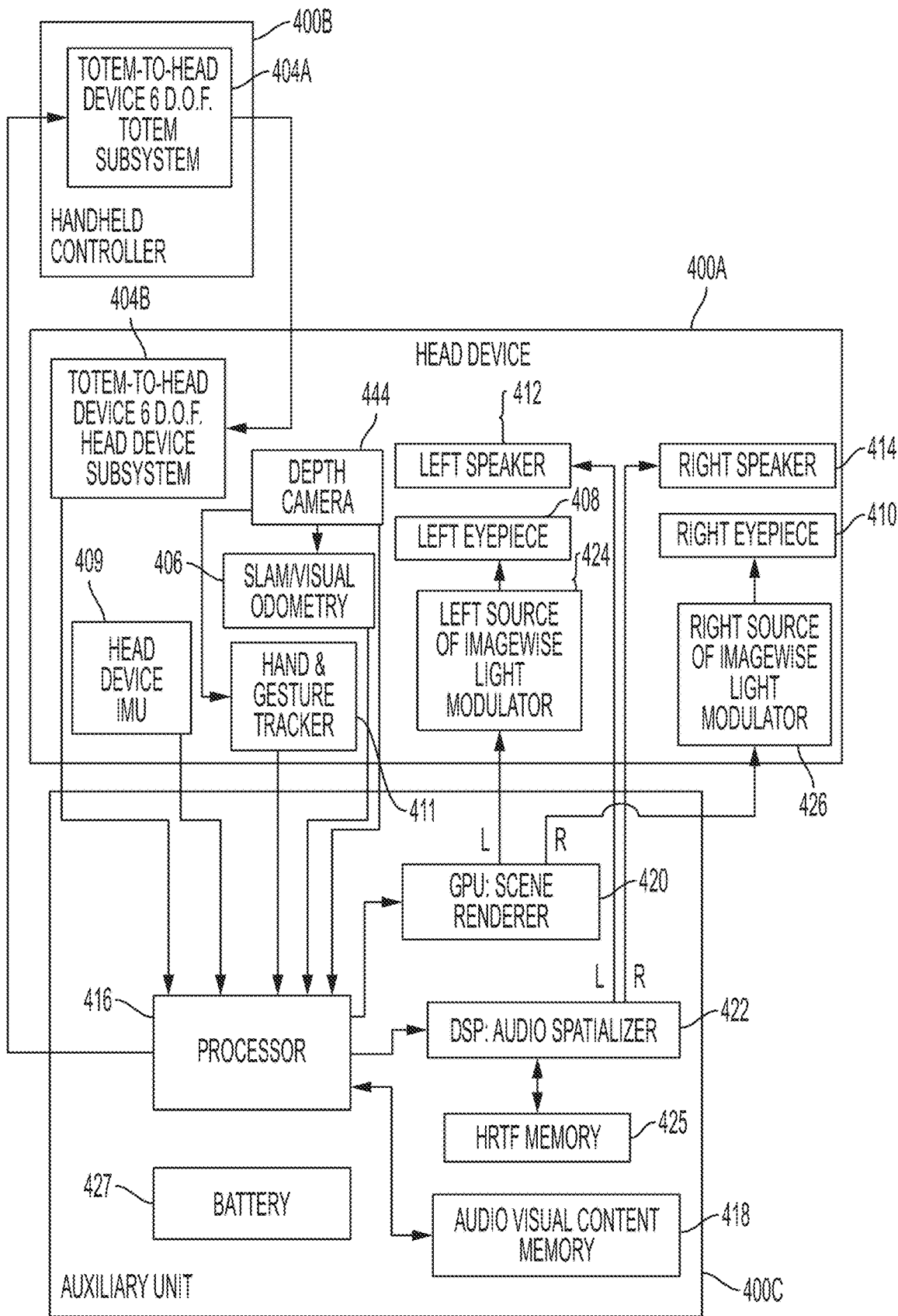
FIG. 4 illustrates an example functional block diagram for an example mixed reality system, according to some embodiments.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/ visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Virtual Sound Synthesis

Virtual sounds can be an important part of creating and/or maintaining an immersive MR experience. A MR experience may include virtual objects interacting with real objects and/or virtual objects interacting with other virtual objects. In these interactions, it may be appropriate to generate virtual audio to accompany visual displays of virtual content. For example, a user may hold a virtual object (e.g., a virtual coffee mug) which may be visually and/or haptically presented to the user. As the user sets the virtual object down on a surface (e.g., a virtual and/or a real table), the user may expect to hear an accompanying virtual sound that reflects a contact between the virtual object and the virtual and/or real surface. In some embodiments, a virtual sound can include a physical sound (e.g., a sound produced by one or more speakers that may be presented to a user). In some embodiments, the virtual sound can correspond to a real and/or virtual event (e.g., a collision between a virtual and a real and/or virtual object) that a user may expect to produce a sound. In some embodiments, an object can be an entirely real object or an entirely virtual object (e.g., it exists only within one or more computing systems). In some embodiments, an object can include both real and virtual components. For example, an object may include a real geometry and a virtual pattern. In some embodiments, the object may be displayed to a user such that the object appears to have the real geometry and the virtual pattern. To ensure an immersive MR experience that seamlessly blends virtual content with real content, the virtual sound accompanying the contact may be associated with certain acoustic properties. For example, the accompanying sound may be a function of one or more materials of the virtual object. The accompanying sound may also be a function of one or more materials of the virtual and/or real surface. In some embodiments, the accompanying sound may be a function of the virtual object's geometry. In some embodiments, the accompanying sound may be a function of a geometry of the virtual and/or real surface. In some embodiments, the accompanying sound may be a function of a real environment (e.g., a room) including the virtual and/or real surface. It may be desirable to produce an accompanying virtual sound that reflects a user's expectation based on their experience with real objects (e.g., the accompanying virtual sound may sound like a real ceramic material contacting a real wooden material). Sound effects, such as the accompanying sound, may be presented to a user via one or more speakers, for example, in a left speaker (e.g., left speaker 2134) and/or a right speaker (e.g., right speaker 2136).

Similar principles may also be applied to haptic effects. In some embodiments, low frequency signals may generally be considered haptic effects (e.g., signals with frequencies below approximately 20 Hz). In some cases, interactions between virtual objects and other virtual objects or virtual objects and real objects may have an accompanying haptic effect. Like the virtual sounds described above, it may be desirable to produce a haptic effect that approximates a haptic effect that a user might expect based on the user's experience with real objects. For example, a MR user setting a virtual coffee mug down on a virtual and/or surface may expect to feel a haptic effect corresponding to a real ceramic object being set down on a real wooden surface. Haptic effects may be a function of one or more materials of the virtual object. In some embodiments, haptic effects may be a function of one or more materials of the virtual and/or real surface. In some embodiments, haptic effects may be a function of the virtual object's geometry. In some embodiments, haptic effects may be a function of a geometry of the virtual and/or real surface. Haptic effects may be presented to a user via a transducer (e.g., a vibration motor), for example, in a handheld interface device (e.g., handheld controller 300).

Virtual sounds and/or haptic effects can be generated in several ways. One method of generation includes one or more databases with prerecorded and/or pre-generated audio samples (e.g., .WAV files). The audio samples may be presented to the user (e.g., by playing the audio samples through a speaker or sending the audio samples to a transducer). In some embodiments, the audio samples may be mixed with other audio samples before being presented to the user. Although it may be computationally efficient to present virtual sounds and/or haptic effects using prerecorded and/or pre-generated audio samples, this method can have several disadvantages. One disadvantage may be that a large amount of memory may be used to store the prerecorded and/or pre-generated audio samples. A MR system may present a wide range of visual virtual content to a user, which may have a wide range of corresponding audio virtual content. For example, virtual objects may collide with, scrape against, rub against, and/or bounce on other virtual and/or real objects. Virtual and/or real objects may also diffract, diffuse, occlude, resonate, and/or absorb virtual sound. In some embodiments, each type of possible interaction between virtual objects and other virtual and/or real objects may require a separate prerecorded and/or pre-generated audio sample. In some embodiments, materials involved in collisions between virtual objects and virtual and/or real objects may be reflected in the virtual audio. For example, contact between two ceramic objects may sound different than contact between a ceramic object and a wooden object. Prerecorded and/or pre-generated audio samples may have different versions of audio samples according to different materials and material combinations, further increasing the storage used for this method of audio generation.

Another disadvantage of using prerecorded and/or pre-generated audio samples is that the generated virtual audio may be limited to the existing audio samples and/or combinations of those audio samples. In some embodiments, it may be desirable to generate virtual audio that may not be producible using existing audio samples and/or combinations of those audio samples. For example, a virtual object may be made out of a fictional material called "vibranium," which may have acoustic properties that differ from acoustic properties of real materials. In some embodiments, the virtual object may clash against other virtual and/or real objects, and it may be desirable to produce a virtual sound to accompany the visual contact. Prerecorded and/or pre-generated audio samples may not include an audio sample suitable for generating a virtual sound associated with vibranium. In some embodiments, it may be desirable to generate virtual audio for objects that may not exist in the real world. For example, a virtual object may be a "flutar," which may be a fictional musical instrument with acoustic properties of both a flute and a guitar. In some embodiments, a user may play a virtual flutar, and it may be desirable to generate virtual sound that has acoustic characteristics of both a real flute and a real guitar.

It can therefore be advantageous to develop a virtual audio synthesis system that can produce a wide range of virtual sounds that still have real acoustic properties that a user expects in a virtual sound. In some embodiments, virtual audio may be synthesized "on-the-fly," using digital foley. Digital foley may include synthesizing virtual audio "from scratch" (e.g., synthesizing virtual audio without using prerecorded and/or pre-generated audio samples). In some embodiments, a synthesized virtual sound can represent compressions and/or rarefactions of air occurring at a user's left and/or right ear as if the interactions of virtual and/or real objects occurred with equivalent real objects. In some embodiments, a virtual audio synthesis system can include modeling physical characteristics of virtual and/or real objects (e.g., geometry, material composition, and the like), modeling collision physics (e.g., impact forces, resonation, and the like), and/or parametrically synthesizing virtual audio using physical and/or non-physical parameters.

Figure 5:
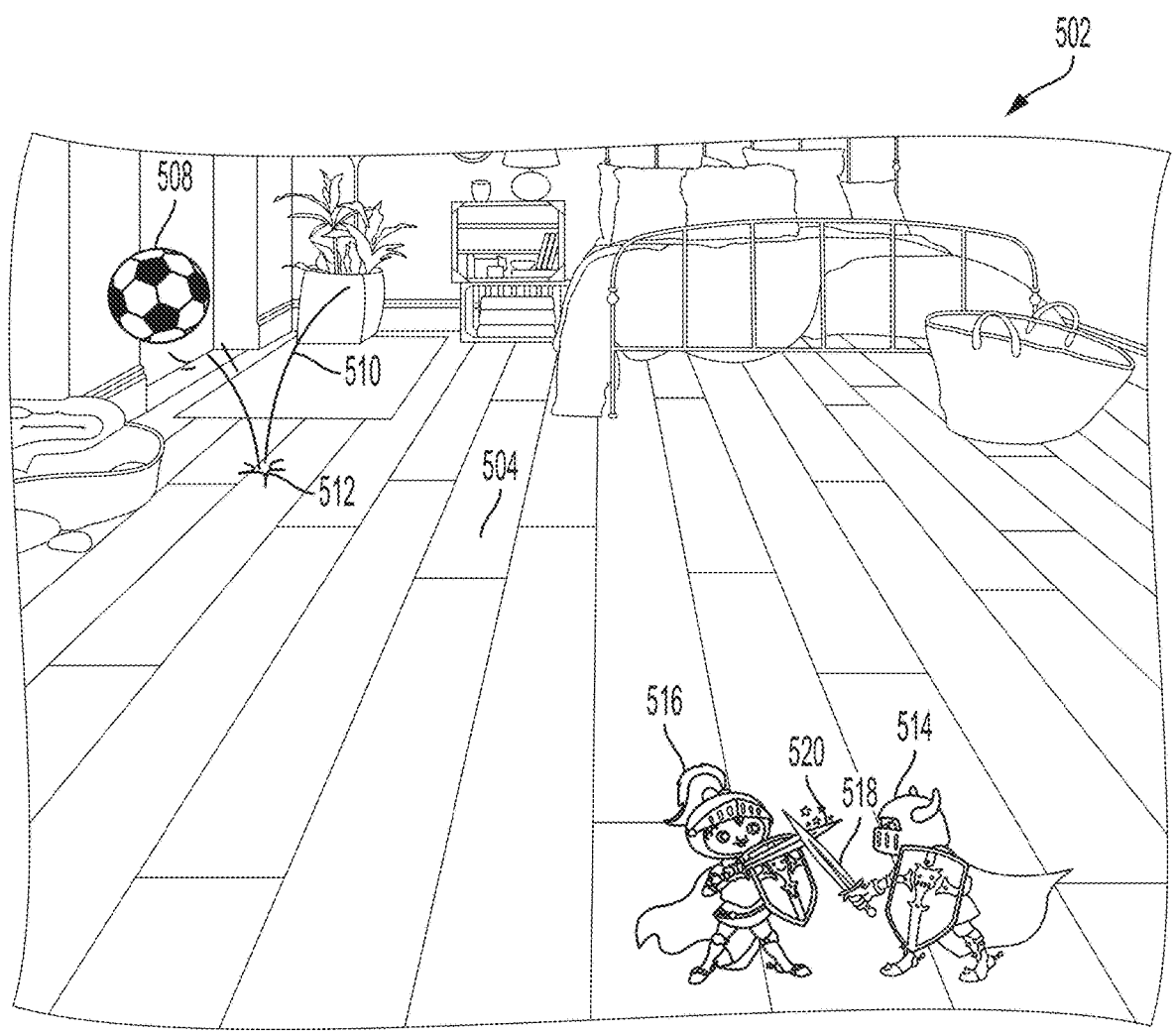
FIG. 5 illustrates an example mixed reality environment, according to some embodiments.

FIG. 5 illustrates an exemplary mixed reality environment, according to some embodiments. Mixed reality environment ("MRE") 502 (which can correspond to MRE 150) can include one or more virtual objects and one or more real objects. In some embodiments, one or more virtual objects may interact with one or more real objects and/or one or more virtual objects within MRE 502. For example, virtual ball 508 may bounce off of real floor 504 along path 510. In some embodiments, it may be desirable to present a virtual sound (e.g., a "thunk") to accompany the visual contact between virtual ball 508 and real floor 504 at contact point 512. To maintain an immersive mixed reality experience, it may be desirable to synthesize the virtual sound to reflect acoustic characteristics that a user may expect to hear when a real ball (e.g., a soccer ball) bounces on a real floor (e.g., a wooden floor). For example, synthesizing the virtual audio may include identifying and/or accounting for a material of real floor 504, a material of virtual ball 508, a speed of virtual ball 508, a mass of virtual ball 508, a geometry of virtual ball 508, a surface area of virtual ball 508, a volume of virtual ball 508, a geometry of real floor 504, and/or other factors.

In some embodiments, one or more virtual objects in MRE 502 may interact with other virtual objects in MRE 502. For example, virtual knight 516 may wield a virtual sword 520, while virtual villain 514 may wield a virtual sword 518. While virtual knight 516 is fighting virtual villain 514, virtual swords 520 and 518 may collide. It may be desirable to produce a "clang" virtual sound upon collision. In some embodiments, synthesizing the virtual sound can account for a mass of each virtual sword, a material composition of each virtual sword, a speed of each virtual sword, a geometry of each virtual sword, and/or other factors. In some embodiments, synthesizing virtual audio using physics-based models can produce virtual audio that may be indistinguishable from sounds of real objects interacting with other real objects. In some embodiments, synthesizing the virtual sound can account for material of real floor 504, a geometry of real floor 504, properties of a room/environment (including virtual knight 516 and virtual villain 514), and/or other factors.

In some embodiments, virtual audio synthesis system may account for acoustic properties of a virtual and/or real environment. A virtual and/or real environment may affect characteristics a user expects of a virtual sound by affecting how a virtual sound propagates through the virtual and/or real environment. For example, a large, cavernous virtual and/or real environment with many hard surfaces may lead a user to expect virtual sounds to produce significant echoes. A small virtual and/or real environment with significant cushioning/dampening may lead a user to expect muted virtual sounds. In some embodiments, physical and/or perceptually relevant properties can include acoustic properties like a reverberation time, reverberation delay, and/or reverberation gain. A reverberation time may include a length of time required for a sound to decay by a certain amount (e.g., by 60 decibels). Sound decay can be a result of sound reflecting off surfaces in a real environment (e.g., walls, floors, furniture, etc.) whilst losing energy due to, for example, sound absorption by a room's boundaries (e.g., walls, floors, ceiling, etc.), objects inside the room (e.g., chairs, furniture, people, etc.), and/or the air in the room. A reverberation time can be influenced by environmental factors. For example, absorbent surfaces (e.g., cushions) may absorb sound, and a reverberation time may be reduced as a result. In some embodiments, it may not be necessary to have information about an original source to estimate an environment's reverberation time. A reverberation gain can include a ratio of a sound's direct/source/original energy to the sound's reverberation energy (e.g., energy of a reverberation resulting from the direct/source/original sound) where a listener and the source are substantially co-located (e.g., a user may clap their hands, producing a source sound that may be considered substantially co-located with one or more microphones mounted on a head-wearable MR system). For example, an impulse (e.g., a clap) may have an energy associated with the impulse, and the reverberation sound from the impulse may have an energy associated with the reverberation of the impulse. The ratio of the original/source energy to the reverberation energy may be a reverberation gain. A real environment's reverberation gain may be influenced by, for example, absorbent surfaces that can absorb sound and thereby reduce a reverberation energy. Other physically and/or perceptually relevant can include location-dependent magnitude and/or phase responses, absorption coefficients, impulse responses, and/or energy decay relief.

Figure 6:
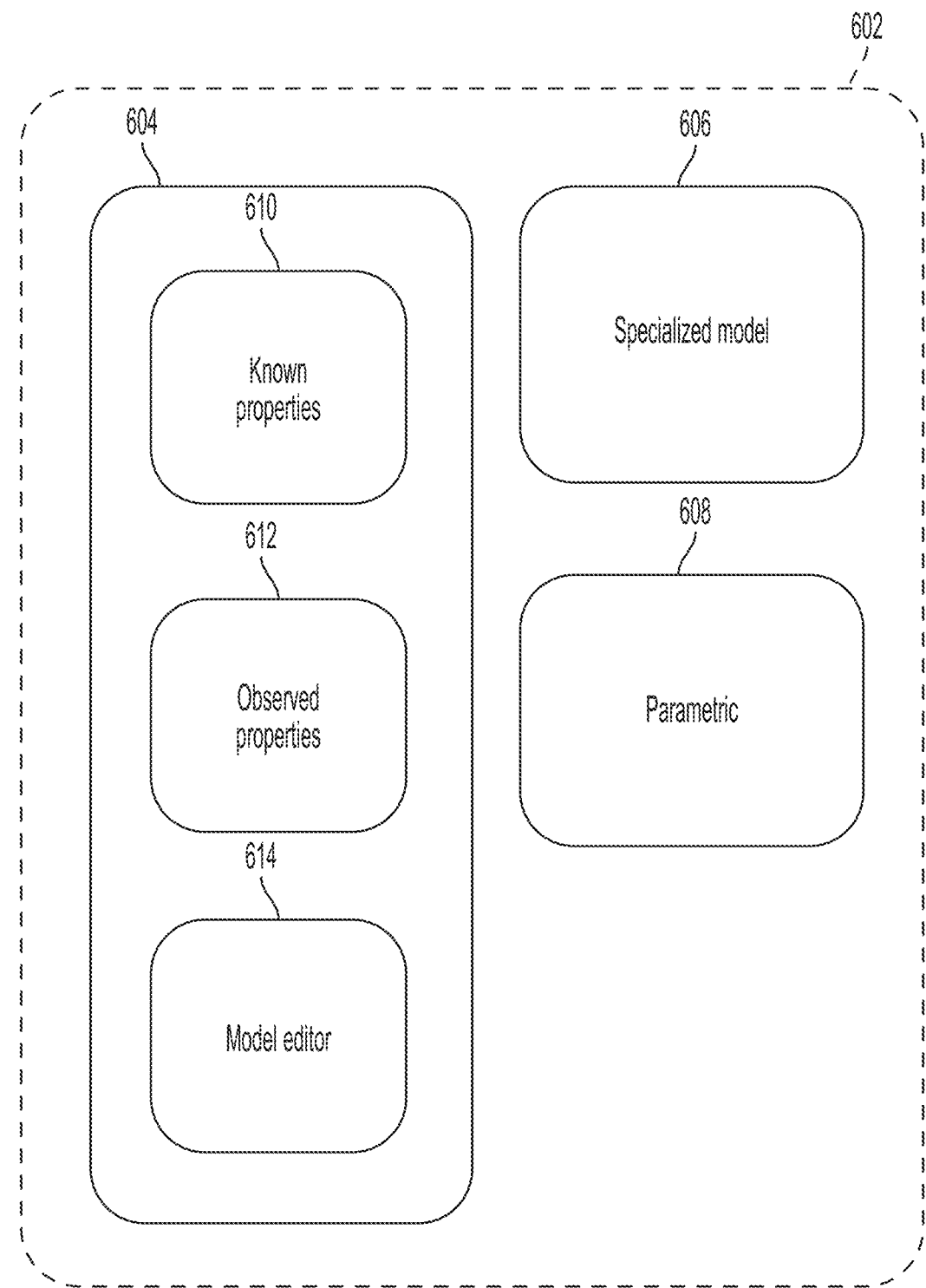
FIG. 6 illustrates an example virtual audio synthesis system, according to some embodiments.

FIG. 6 illustrates an exemplary virtual audio synthesis system, according to some embodiments. Virtual audio synthesis system 602 can include one or more computer systems configured to execute instructions and/or store one or more data structures. For example, instructions executed by virtual audio synthesis system 602 may be a process, which may run in a run-time environment. In some embodiments, instructions executed by virtual audio synthesis system 602 can be a sub-process of a parent process. In some embodiments, instructions executed by virtual audio synthesis system can be a thread of a parent process. In some embodiments, instructions executed by virtual audio synthesis system 602 can operate as a service (e.g., as a background operating system service). In some embodiments, instructions executed by virtual audio synthesis system 602 can continually run (e.g., in the background) while an operating system of a MR system is running. In some embodiments, instructions executed by virtual audio synthesis system 602 can be an instantiation of a parent background service, which may serve as a host process to one or more background processes and/or sub-processes. In some embodiments, instructions executed by virtual audio synthesis system 602 can be part of an operating system of a MR system. In some embodiments, instructions executed by virtual audio synthesis system 602 and/or data structures stored in virtual audio synthesis system 602 can be accessible to applications that may run on the MR system. In some embodiments, a process (e.g., a process managed by a third-party application) may request that a virtual sound be presented. Such a request may take any suitable form. In some embodiments, a request that a virtual sound be presented can include a software instruction to present the virtual sound; in some embodiments, such a request may be hardware-driven. Requests may be issued with or without user involvement. Further, such requests may be received via local hardware (e.g., from the MR system itself), via external hardware (e.g., a separate computer system in communication with the MR system), via the internet (e.g., via a cloud server), or via any other suitable source or combination of sources. Virtual audio synthesis system 602 and/or a parent background service (e.g., a parent audio rendering service) may receive this request (e.g., because virtual audio synthesis system 602 may be listening in the background for such requests), and virtual audio synthesis system 602 may synthesize a virtual sound. In some embodiments, a process may directly communicate with virtual audio synthesis system 602 (e.g., via an API). In some embodiments, virtual audio synthesis system 602 can provide a synthesized virtual sound to other processes, threads, and/or services (e.g., a synthesized virtual sound may be passed to a rendering engine).

In some embodiments, virtual audio synthesis system 602 may include one or more modules (e.g., modules 604, 606, and 608), which may be components of virtual audio synthesis system 602. In some embodiments, a module can include one or more computer systems configured to execute instructions and/or store one or more data structures. For example, instructions executed by a module can be a process and/or sub-process running within virtual audio synthesis system 602. In some embodiments, instructions executed by a module can be a thread running within virtual audio synthesis system 602. In some embodiments, instructions executed by a module may run within the same process address space and/or memory space as other components of virtual audio synthesis system 602. In some embodiments, instructions executed by a module may run in a different process address space and/or memory space as other components of virtual audio synthesis system 602. In some embodiments, instructions executed by a module may run on different hardware than other components of virtual audio synthesis system 602. For example, instructions executed by one or more modules of virtual audio synthesis system 602 may run on an audio-specific processor (e.g., a DSP), while other components of virtual audio synthesis system 602 may run on a general-purpose processor. In some embodiments, instructions executed by one or more modules of virtual audio synthesis system 602 may be instantiated within virtual audio synthesis system 602. In some embodiments, instructions executed by and/or data structures stored in modules within virtual audio synthesis system 602 may communicate with other components of virtual audio synthesis system 602 (e.g., with instructions executed by and/or data structures stored in other modules).

In some embodiments, virtual audio synthesis system 602 may include one or more modules and the one or more modules may include one or more sub-modules. In some embodiments, a sub-module can include one or more computer systems configured to execute instructions and/or store one or more data structures. For example, instructions executed by a sub-module can be a process and/or sub-process running within virtual audio synthesis system 602. In some embodiments, instructions executed by a sub-module can be a thread running within virtual audio synthesis system 602. In some embodiments, instructions executed by a sub-module may run within the same process address space and/or memory space as other components of virtual audio synthesis system 602. In some embodiments, instructions executed by a sub-module may run in a different process address space and/or memory space as other components of virtual audio synthesis system 602. In some embodiments, instructions executed by a sub-module may run on different hardware than other components of virtual audio synthesis system 602. For example, instructions executed by one or more sub-modules of virtual audio synthesis system 602 may run on an audio-specific processor (e.g., a DSP), while other components of virtual audio synthesis system 602 may run on a general-purpose processor. In some embodiments, instructions executed by one or more sub-modules of virtual audio synthesis system 602 may be instantiated within virtual audio synthesis system 602. In some embodiments, instructions executed by and/or data structures stored in sub-modules within virtual audio synthesis system 602 may communicate with other components of virtual audio synthesis system 602 (e.g., with instructions executed by and/or data structures stored in other modules).

In some embodiments, virtual audio synthesis system 602 may include generic model module 604. In some embodiments, generic model module 604 may be used to synthesize virtual sounds for any virtual objects and/or collisions between virtual objects and/or real objects. Generic model module 604 may include known properties sub-module 610.

In some embodiments, known properties sub-module 610 may include one or more data structures (e.g., a database) representing known material properties for common materials. For example, known properties sub-module 610 may include absorption coefficients, diffusion characteristics, isolation characteristics (e.g., sound transmission class, noise criterion level, noise reduction coefficient), Young's modulus, compliance, physical absorption, albedo, brittleness, density, elasticity, fluidity, tension, stiffness, strength, and/or boiling point for materials like concrete, brickwork, plaster, ceramic, plasterboard, glass, plywood, wood paneling, fiberglass, cork, marble, carpet, and/or other materials or variations of materials. In some embodiments, known properties of materials can be stored locally on a MR system. In some embodiments, known properties of materials can be stored on a remote server and retrieved by a MR system. In some embodiments, known properties sub-module 610 may include one or more data structures (e.g., a database) representing properties of virtual and/or real environments. In some embodiments, properties of virtual and/or real environments can be determined by a MR system (e.g., by firing an impulse response via speakers and receiving the response via microphones). In some embodiments, properties of virtual and/or real environments can be determined by other MR systems and uploaded to a remote server which may be accessed by MR systems.

In some embodiments, virtual audio synthesis system 602 may be able to receive and/or determine properties of virtual objects (e.g., at known properties sub-module 610). For example, an application or an object database may provide properties of a virtual object to a virtual audio synthesis system. In some embodiments, a 3D mesh of a virtual object can be provided to virtual audio synthesis system 602, which may allow virtual audio synthesis system 602 to model the virtual object's geometry. In some embodiments, properties associated with a virtual object (e.g., a material composition) may be passed to virtual audio synthesis system 602. In some embodiments, a collision between virtual objects may be determined via a physics engine (e.g., Unreal or Unity). In some embodiments, a physics engine may provide properties of a virtual object (e.g., a speed of a virtual object, impact forces, etc.) to virtual audio synthesis system 602.

In some embodiments, generic model module 604 may include observed properties sub-module 612. Observed properties sub-module 612 may store and/or determine properties of virtual and/or real objects that may not be found in known properties sub-module 610. For example, a MR system may be able to automatically determine properties of real objects using one or more sensors (e.g., one or more sensors of a MR system). In some embodiments, one or more optical cameras mounted on a MR system (e.g., MR system 112, 200) may observe and identify a real object using computer-vision methods. Visually observable properties (e.g., a color and/or a patterning) may allow a MR system to determine a material composition of the real object. In some embodiments, one or more depth cameras mounted on a MR system (e.g., MR system 112, 200) may be used to determine density of the real object. In some embodiments, one or more microphones mounted on a MR system may record audio signals of a real object interacting with other real objects. In some embodiments, optical cameras and/or depth cameras (e.g., time-of-flight cameras) may observe a velocity of a real object. In some embodiments, optical cameras and/or depth cameras may allow a MR system to determine a collision between a virtual object and a real object (e.g., using simultaneous localization and mapping ("SLAM")). Other suitable sensors of a MR system may also be used to determine properties of real objects to accurately model acoustic characteristics of those objects. Observed properties sub-module 612 may also store and/or determine properties of a virtual and/or real environment.

In some embodiments, generic model module 604 may include model editor sub-module 614. Model editor sub-module 614 may allow a user to manually edit properties (e.g., properties stored in known properties sub-module 610 and/or observed properties sub-module 612). For example, a user may manually define and/or edit aspects of a 3D mesh of a virtual object, or a user may manually specify a desired absorption coefficient to use in virtual audio synthesis. In some embodiments, a user may manually edit properties using a graphical user interface ("GUI"), which may be provided by model editor sub-module 614. In some embodiments, model editor sub-module 614 can provide one or more presets, which may correspond to common and/or known real and/or virtual objects. For example, model editor sub-module 614 can include a ping pong ball preset, which may have acoustic properties of a ping pong ball that have been empirically determined and/or previously analytically determined. Model editor sub-module 614 can be an engine plug-in (e.g., a physics and/or a game engine), a standalone application, and/or a web authoring tool.

In some embodiments, virtual audio synthesis system 602 may include a specialized model module 606. Specialized model module 606 may store and/or retrieve known acoustic models for real and/or virtual objects. Known acoustic models for real and/or virtual objects may be more computationally efficient and/or accurate to use than a model developed from scratch (e.g., using observed and/or known properties). For example, an 88-key piano may have a known acoustic model of how a virtual and/or real piano should sound that takes as input which key is played and how hard the key is struck. The known acoustic model may be more efficient and/or accurate than physically modeling hammers, action frames, tuning pins, strings, and/or a soundboard of an 88-key piano. In some embodiments, known acoustic models may be retrieved from a remote server. In some embodiments, a MR system may develop an acoustic model from scratch and upload the acoustic model (which may be associated with a virtual and/or real object) to a remote server, which may be retrieved by a MR system.

In some embodiments, virtual audio synthesis system 602 may include parametric module 608. Parametric module 608 may synthesize virtual sounds using physical and/or non-physical parameters. For example, it may be desirable to synthesize virtual audio according to a parameter of how far a user has progressed in a game level. In some embodiments, parametric module 608 may synthesize virtual audio that may not originate from a collision. For example, parametric module 608 may synthesize virtual sounds originating from a car engine. Parametric module 608 may take as input parameters like engine load, RPM, and/or vehicle speed to synthesize virtual sounds. In some embodiments, parametric module 608 may modify and/or affect virtual sounds synthesized by other modules (e.g., generic model module 604 or specialized model module 606). For example, a virtual sound originating from a collision may be modified in amplitude by how far a user has progressed in a game level. In some embodiments, parametric module 608 can include arbitrary excitation functions, resonators, and/or signal-processing components, which a user may use and/or combine to produce procedurally generated audio.

Figure 7:
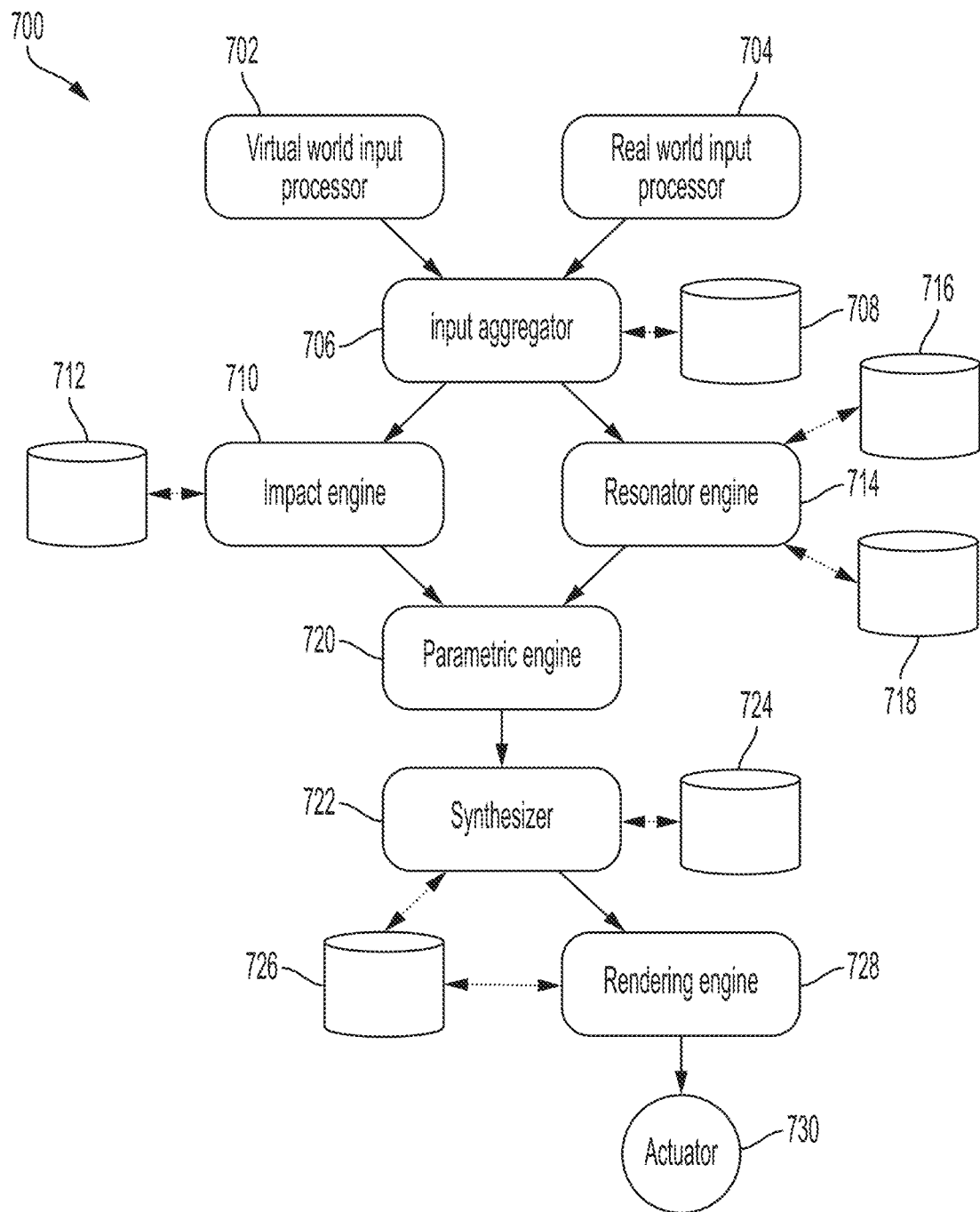
FIG. 7 illustrates an example virtual audio synthesis system, according to some embodiments.

FIG. 7 illustrates an exemplary virtual audio synthesis system 700, according to some embodiments. In some embodiments, virtual audio synthesis system 700 may correspond to virtual audio synthesis system 602. Input aggregator 706 may receive data from virtual world input processor 702. Virtual world input processor 702 may receive and/or determine virtual object data, which may be relevant to virtual audio synthesis (e.g., a material composition of a virtual object or a speed of a virtual object). In some embodiments, virtual world input processor 702 can be a physics engine (e.g., Unity or Unreal), which may calculate physical interactions between objects. In some embodiments, virtual world input processor 702 can receive data from a physics engine. For example, virtual world input processor 702 may receive collision data, speed data, material composition data, geometry data, and/or other data about one or more virtual objects from a physics engine. In some embodiments, virtual object data can be received from a remote server.

In some embodiments, virtual world input processor 702 may receive and/or determine virtual environment data. Virtual environment data can include properties of a virtual environment. For example, virtual environment data can include dimensions and/or a geometry of a virtual environment. In some embodiments, virtual environment data can include a material composition of surfaces (e.g., floors, walls) of a virtual environment. In some embodiments, virtual environment data can include a placement of real and/or virtual objects within a virtual environment. In some embodiments, virtual environment data can include acoustic properties of a virtual environment, such as a reverberation time, reverberation delay, and/or a reverberation gain. In some embodiments, properties of a virtual environment may be passed to virtual world input processor 702 (e.g., from a physics engine). In some embodiments, properties of a virtual environment may be determined by virtual world input processor 702 (e.g., a virtual world input processor may determine a reverberation time based on a geometry and/or material composition of a virtual environment). In some embodiments, virtual environment data may be received from a remote server.

In some embodiments, input aggregator 706 may receive data from real world input processor 704. Real world input processor 704 may receive and/or determine real object data, which may be relevant to virtual audio synthesis (e.g., a material composition of a real object or a speed of a real object). Real world input processor 704 may receive data from one or more sensors, for example, one or more sensors of a MR system (e.g., MR system 112, 200). For example, a MR system may include an optical sensor (e.g., a camera) that may observe visual characteristics of a real object. Real world input processor 704 may determine a material composition of a real object based on a color, visual pattern, and/or a visual texture of a real object. In some embodiments, a MR system may include a depth sensor (e.g., a time-of-flight camera) that may observe a real object's position in three-dimensional space. Real world input processor 704 may determine a speed of a real object based on depth data and/or optical data.

In some embodiments, real world input processor 704 may receive and/or determine real environment data. Real environment data can include properties of a real environment. For example, real environment data can include dimensions and/or a geometry of a real environment. In some embodiments, real environment data can include a material composition of surfaces (e.g., floors, walls) of a real environment. In some embodiments, real environment data can include a placement of real and/or virtual objects within a real environment. In some embodiments, real environment data can include acoustic properties of a real environment, such as a reverberation time, reverberation delay, and/or a reverberation gain. In some embodiments, real world input processor 704 may determine real environment data from one or more sensors (e.g., one or more sensors of a MR system). For example, a microphone of a MR system may observe characteristics of audio signals in the real environment, and real world input processor 704 may estimate a reverberation time for the real environment. In some embodiments, real world input processor 704 may receive real environment data from a remote server.

Input aggregator 706 may receive and/or aggregate data (e.g., virtual and/or real object data) from virtual world input processor 702 and/or real world input processor 704. In some embodiments, input aggregator 706 can aggregate, store, and/or retrieve virtual and/or real object data in database 708. In some embodiments database 708 can include a materials database, which may include a list of common and/or known materials and corresponding acoustic properties (e.g., absorption coefficients; diffusion characteristics; isolation characteristics such as sound transmission class, noise criterion level, noise reduction coefficient; Young's modulus; compliance; physical absorption; albedo; brittleness; density; elasticity; fluidity; tension; stiffness; strength; and/or boiling point). In some embodiments, materials data can be retrieved from a remote server and stored in a materials database.

In some embodiments, database 708 can include an environment database, which may include a list of known real and/or virtual environments and corresponding acoustic properties (e.g., reverberation time, reverberation delay, reverberation gain, location-dependent magnitude and/or phase responses, absorption coefficients, impulse responses, and/or energy decay relief/curve). In some embodiments, an environment database may retrieve data from a materials database based on a material composition of the real and/or virtual environment. In some embodiments, environment properties can be retrieved from a remote server and stored in an environment database.

In some embodiments, database 708 can include an objects database, which may include a list of known real and/or virtual objects and corresponding properties. For example, objects database may include a regulation-size soccer ball and its geometry, surface area, volume, material composition, elasticity, mass, and/or other properties. In some embodiments, an objects database may retrieve data from a materials database based on a material composition of a real and/or virtual object. In some embodiments, object data can be retrieved from a remote server and stored in an objects database.

Database 708 may also include other databases, which may include data relevant to synthesizing virtual audio. In some embodiments, a materials database, an environment database, and/or an objects database can be integrated into a single database. In some embodiments, a materials database, an environment database, and/or an objects database can be maintained as separate databases. In some embodiments, input aggregator 706 may store data (e.g., data received from virtual world input processor 702 or real world input processor 704) in database 708. In some embodiments, input aggregator 706 may retrieve data stored in database 708. In some embodiments, database 708 can correspond to known properties sub-module 610 and/or observed properties sub-module 612.

Input aggregator 706 may pass data (e.g., relevant acoustical properties of real and/or virtual objects) to impact engine 710. In some embodiments, impact engine 710 may calculate how a real and/or virtual object vibrates upon impact with another real and/or virtual object. Impact engine 710 may use three-dimensional Newtonian physics to simulate an expected vibration pattern upon impact, which may determine compressions and rarefactions of surrounding air, which may determine a sound perceptible to a user. In some embodiments, impact engine 710 may communicate with database 712, which may include one or more exciters and/or generators. In some embodiments, known exciters and/or generators can be combined and/or used to efficiently model impact vibrations of a real and/or virtual object. In some embodiments, an exciter and/or generator can be represented by one or more functions defining a response to an exciter and/or generator.

Input aggregator 706 may pass data (e.g., relevant acoustical properties of real and/or virtual objects) to a resonator engine 714. In some embodiments, resonator engine 714 may calculate how a real and/or virtual object vibrates after impact with another real and/or virtual object. Resonator engine 714 may use three-dimensional Newtonian physics to simulate an expected vibration pattern after impact, which may determine compressions and rarefactions of surrounding air, which may determine a sound perceptible to a user. In some embodiments, resonator engine 714 may communicate with database 716, which may include one or more resonators. In some embodiments, known resonators can be combined and/or used to efficiently model impact vibrations of a real and/or virtual object. In some embodiments, a resonator can be represented by one or more functions defining a response after an impact. In some embodiments, resonator engine 714 may communicate with database 718, which may include one or more known resonator models. In some embodiments, one or more real and/or virtual objects can have known corresponding resonator models that accurately and efficiently model how the object resonates. For example, a piano may be accurately and efficiently modeled using one or more resonator functions that may be simpler than modeling the full physics of each component part of a piano. When a real and/or virtual object has a corresponding resonator model, resonator engine 714 may use the corresponding resonator model instead of modeling the physics of all component parts of the real and/or virtual object. In some embodiments, after resonator engine 714 has modelled the Newtonian physics of an unknown real and/or virtual object, the model may be stored in database 718 as a known resonator model. In some embodiments, database 718 may retrieve and provide known model data to a remote server. In some embodiments, resonator engine 714 and database 718 may correspond to specialized model module 606. In some embodiments, impact engine 710, database 712, resonator engine 714, and/or database 716 can correspond to generic model module 604.

Parametric engine 720 may receive data from impact engine 710 and/or resonator engine 714, which may provide a representation of how a real and/or virtual object vibrates during and after an impact with another real and/or virtual object. In some embodiments, parametric engine 720 may modify an expected physical response of a real and/or virtual object using one or more parameters. In some embodiments, parametric engine 720 may use non-physical parameters, such as level progression in a game. In some embodiments, parametric engine 720 may map one or more physical parameters to other values. For example, a virtual and/or real object's angular velocity for the purposes of virtual audio synthesis may be mapped to a force exerted on the object. In some embodiments, parametric engine 720 may modify and/or provide parameters that can be interpreted by an excitation and/or resonator function (e.g., an excitation function from database 712 or a resonator function from database 716).

In some embodiments, parametric engine 720 can more efficiently model changing properties than a continuous ground-up approach. For example, a game of ping pong with a virtual ping pong ball may shrink the size of the virtual ping pong ball with each volley. In some embodiments, the size of the virtual ping pong ball could be continuously fed through impact engine 710 and/or resonator engine 714 to determine the acoustic properties of the ping pong ball. In some embodiments, parametric engine 720 may be able to parameterize the shrinking size to reach substantially the same result.

Synthesizer 722 can receive data from parametric engine 720, such as acoustic properties of a real and/or virtual object that may have been parametrically modified. Synthesizer 722 may synthesize a virtual sound based on data received from parametric engine 720. Synthesizer 722 may communicate with database 724, which may include synthesis methods. Synthesis methods can include oscillators (e.g., sine waves, triangle waves, sawtooth waves, square waves), filters, amplifiers, envelope generators, and/or modulators (e.g., low-frequency oscillators, ring modulators) to create one or more waveforms, which may be stacked together. Synthesis methods can also include time-domain modal analysis-based synthesis, frequency-domain modal analysis-based synthesis, analytical physical modeling synthesis, finite-element-modeling-based physical modeling synthesis, analog modeling synthesis, classical numerical synthesis (e.g., AM/FM, additive/subtractive, wave-terrain, granular, wavetable, concatenative, formant-wave-function), and/or filter objects (e.g., 1-pole, 1-zero, biquad, comb, delay line, allpass, waveshaper, compander, lowpass, highpass, bandpass, bandstop).

In some embodiments, synthesizer 722 can pass data (e.g., a synthesized sound) to database 726, which can include synthesized sounds. In some embodiments, synthesizer 722 can pass data (e.g., a synthesized sound) to rendering engine 728. Rendering engine 728 may render a virtual sound according to a corresponding spatial positioning of a virtual sound source. For example, a virtual sound source behind a user may cause rendering engine 728 to render the virtual sound such that it appear to the user to be coming from behind. In some embodiments, rendering engine 728 may communicate with database 726, which may include synthesized sounds and/or prerecorded/pre-generated sounds. In some embodiments, rendering engine 728 can provide data to actuator 730 (e.g., one or more speakers) to present the virtual sound to a user.

Figure 8:
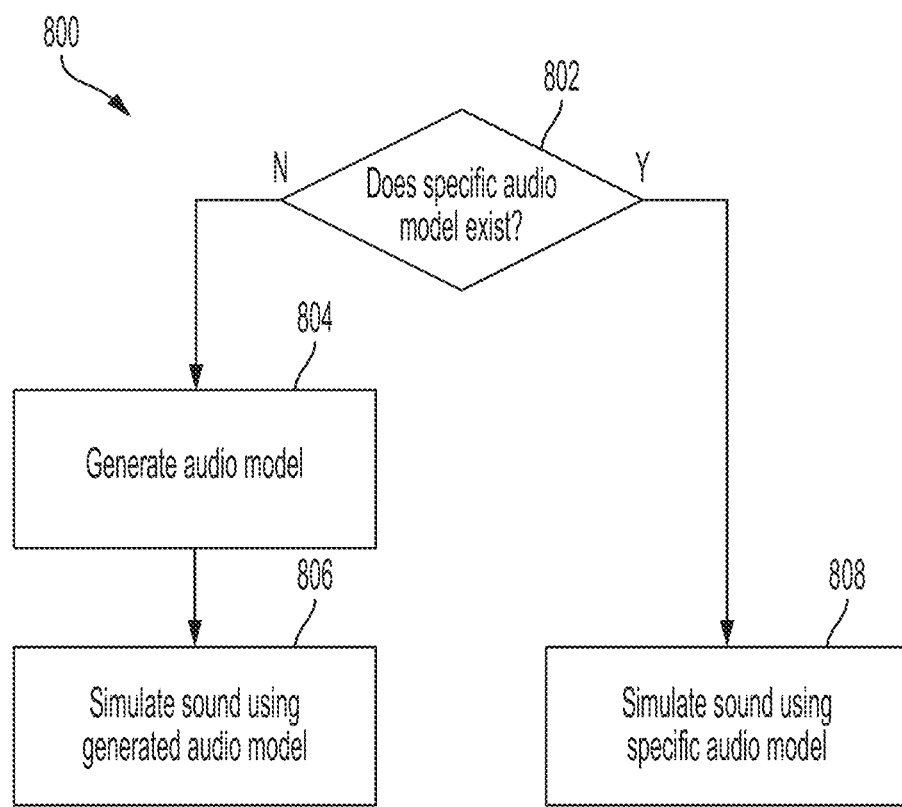
FIG. 8 illustrates an example process for choosing an audio model, according to some embodiments.

FIG. 8 illustrates an exemplary process 800 for choosing an audio model, according to some embodiments. In some embodiments, process 800 can occur in resonator engine 714. At step 802, it can be determined if a specific audio model exists for a real and/or virtual object. In some embodiments, the determination can be based on an identifier (e.g., a keyword identifier or a unique identifier) associated with a real and/or virtual object. In some embodiments, an identifier for a virtual object may be passed to resonator engine 714 (e.g., from virtual world input processor 702, or from an application that created the virtual object). In some embodiments, an identifier for a real object can be determined (e.g., by real world input processor 704 using computer vision and/or machine learning algorithms to identify a real object). If it is determined that a specific audio model exists for a real and/or virtual object, a specific audio model corresponding to the real and/or virtual object may be used at step 808 (e.g., a specific audio model stored in database 718). If it is determined that a specific audio model does not exist for a real and/or virtual object, an audio model can be generated at step 804 using properties of the real and/or virtual object. At step 806, the generated audio model can be used to simulate sound for the real and/or virtual object.

Figure 9:
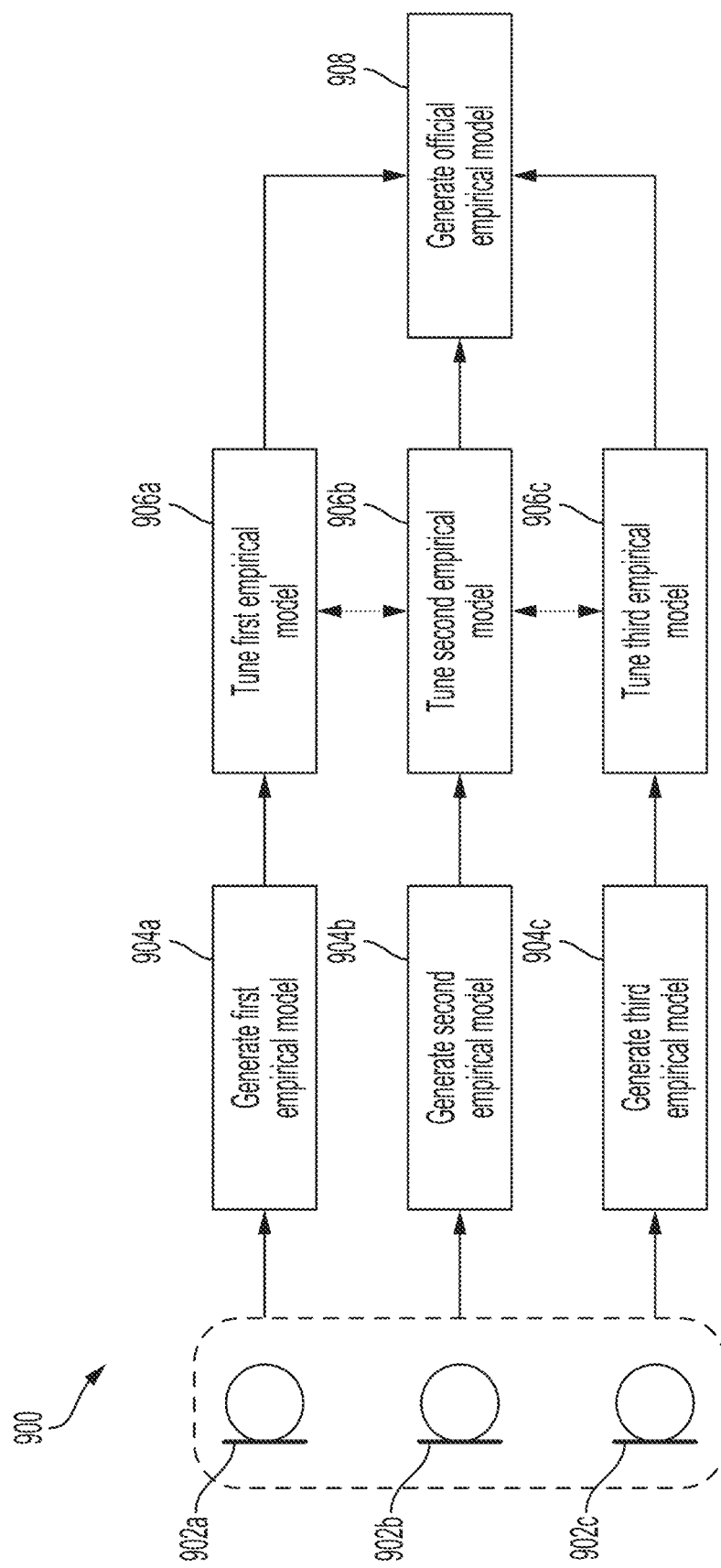
FIG. 9 illustrates an example process for generating an empirical audio model, according to some embodiments.

FIG. 9 illustrates an exemplary process 900 for generating an empirical audio model, according to some embodiments. In some embodiments, process 900 can be performed by model editor sub-module 614. It can be beneficial to use an empirical audio model when an analytical model (e.g., a model based on Newtonian physics) may be infeasible (e.g., when an object's geometry is sufficiently complex). In some embodiments, an official empirical model can be based on one or more different empirical models formed from different observations.

Sensor 902a can include an audio sensor (e.g., a microphone) that can capture an audio signal produced by the object when it collides with another object. A first empirical model can be generated based on data from sensor 902a at step 904a. Sensor 902b can include an optical sensor (e.g., a camera) or a process that can read a file containing three-dimensional geometry (e.g., a process that can read a mesh file). A second empirical model can be generated based on data from sensor 902b at step 904b. In some embodiments, a second empirical model can be generated using finite-element modeling of an object geometry. Sensor 902c can include a motion sensor (e.g., an accelerometer) that can capture vibrations of an object when it collides with another object. A third empirical model can be generated based on data from sensor 902c at step 904c.

At steps 906a, 906b, and 906c, the first, second, and third empirical models can be tuned to each other and/or with respect to each other. In some embodiments, the tuning process can be iterative between the empirical models. In some embodiments, the tuning process can bring the multiple empirical models in closer agreement (e.g., the empirical models generated from different data can produce similar expected vibrations for an object). At step 908, an official empirical model can be generated based on the one or more individual empirical models. In some embodiments, the official empirical model can be made available to other components of a virtual audio synthesis system (e.g., an official empirical model may be stored in database 718 as a known model). Although three empirical models are shown, it is contemplated that any number of empirical models can be generated from different data, including two, or four or more. Including additional empirical models may increase an accuracy of an official empirical model, but may also reduce the likelihood of convergence between the individual models and/or increase a computational load.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method comprising:
   presenting, via a display of a wearable head device, a view of a virtual environment;
   determining a collision between a first object and a second object in the virtual environment, wherein the first object comprises a first virtual object;
   accessing a memory storing acoustic data;
   determining whether the acoustic data stored in the memory comprises first acoustic data corresponding to the first object;
   in accordance with a determination that the acoustic data stored in the memory comprises the first acoustic data corresponding to the first object:
      determining a first audio signal based on the collision and based further on the first acoustic data corresponding to the first object, and
      concurrently with presenting the view of the virtual environment via the display, presenting the first audio signal via a speaker of the wearable head device; and
   in accordance with a determination that the acoustic data stored in the memory does not comprise the first acoustic data corresponding to the first object:
      determining an acoustic property of the first object,
      determining a second audio signal based on the collision and based further on the acoustic property, and
      concurrently with presenting the view of the virtual environment via the display, presenting the second audio signal via the speaker of the wearable head device.

2. The method of claim 1, wherein the second object comprises a second virtual object.

3. The method of claim 1, wherein the second object comprises a real object.

4. The method of claim 3, further comprising:
   receiving, via one or more sensors of the wearable head device, sensor data associated with the real object;
   determining an acoustic characteristic of the second object based on the sensor data; and
   generating an audio model corresponding to the second object based on the acoustic characteristic.

5. The method of claim 1, wherein the determining the first audio signal comprises determining a material of the first object and applying a property of the material as input to an audio synthesizer.

6. The method of claim 1, wherein the determining the first audio signal comprises:
   receiving a first property of the first object from a database;
   observing a second property of the first object; and
   applying the first property and the second property as input to an audio synthesizer.

7. A system comprising:
   a wearable head device comprising:
      a display;
      a speaker; and
      one or more sensors; and
   one or more processors configured to perform a method comprising:
      presenting, via the display, a view of a virtual environment;
      determining a collision between a first object and a second object in the virtual environment, wherein the first object comprises a first virtual object;

accessing a memory storing acoustic data;
determining whether the acoustic data stored in the memory comprises first acoustic data corresponding to the first object;
in accordance with a determination that the acoustic data stored in the memory comprises the first acoustic data corresponding to the first object:
determining a first audio signal based on the collision and based further on the first acoustic data corresponding to the first object, and
concurrently with presenting the view of the virtual environment via the display, presenting the first audio signal via the speaker; and
in accordance with a determination that the acoustic data stored in the memory does not comprise the first acoustic data corresponding to the first object:
determining an acoustic property of the first object,
determining a second audio signal based on the collision and based further on the acoustic property, and
concurrently with presenting the view of the virtual environment via the display, presenting the second audio signal via the speaker.

8. The system of claim 7, wherein the second object comprises a second virtual object.

9. The system of claim 7, wherein the second object comprises a real object.

10. The system of claim 9, wherein the method further comprises:
receiving, via the one or more sensors, sensor data associated with the real object;
determining an acoustic characteristic of the second object based on the sensor data; and
generating an audio model corresponding to the second object based on the acoustic characteristic.

11. The system of claim 7, wherein the determining the first audio signal comprises determining a material of the first object and applying a property of the material as input to an audio synthesizer.

12. The system of claim 7, wherein the determining the first audio signal comprises:
receiving a first property of the first object from a database;
observing a second property of the first object; and
applying the first property and the second property as input to an audio synthesizer.

13. A non-transitory computer-readable medium storing instructions which, when executed by one or more processors, cause the one or more processors to perform a method comprising:
presenting, via a display of a wearable head device, a view of a virtual environment;
determining a collision between a first object and a second object in the virtual environment, wherein the first object comprises a first virtual object;
accessing a memory storing acoustic data;
determining whether the acoustic data stored in the memory comprises first acoustic data corresponding to the first object;
in accordance with a determination that the acoustic data stored in the memory comprises the first acoustic data corresponding to the first object:
determining a first audio signal based on the collision and based further on the first acoustic data corresponding to the first object, and
concurrently with presenting the view of the virtual environment via the display, presenting the first audio signal via a speaker of the wearable head device; and
in accordance with a determination that the acoustic data stored in the memory does not comprise the first acoustic data corresponding to the first object:
determining an acoustic property of the first object,
determining a second audio signal based on the collision and based further on the acoustic property, and
concurrently with presenting the view of the virtual environment via the display, presenting the second audio signal via the speaker of the wearable head device.

14. The non-transitory computer-readable medium of claim 13, wherein the second object comprises a second virtual object.

15. The non-transitory computer-readable medium of claim 13, wherein the second object comprises a real object.

16. The non-transitory computer-readable medium of claim 15, wherein the method further comprises:
receiving, via one or more sensors of the wearable head device, sensor data associated with the real object;
determining an acoustic characteristic of the second object based on the sensor data; and
generating an audio model corresponding to the second object based on the acoustic characteristic.

17. The non-transitory computer-readable medium of claim 13, wherein the determining the first audio signal comprises:
receiving a first property of the first object from a database;
observing a second property of the first object; and
applying the first property and the second property as input to an audio synthesizer.

* * * * *